United States Patent [19]

Schultz et al.

[11] Patent Number: 4,999,474
[45] Date of Patent: Mar. 12, 1991

[54] GAS MIXTURE AND WELDING METHOD

[75] Inventors: Jean-Pierre Schultz, Meulan; Jean Soler, Bessancourt; Daniel Nicoud, Metz, all of France

[73] Assignee: L'Air Liquide, Societe Anonyme pour l'Etude et L'Exploitation des Procedes Georges Claude, Paris, France

[21] Appl. No.: 499,882

[22] Filed: Mar. 27, 1990

[30] Foreign Application Priority Data

Mar. 30, 1989 [FR] France ................................. 89 04192

[51] Int. Cl.$^5$ ............................................. B23K 9/173
[52] U.S. Cl. .................................... 219/74; 219/137 R
[58] Field of Search ....................... 219/74, 136, 137 R

[56] References Cited

U.S. PATENT DOCUMENTS

| 3,139,506 | 6/1964 | Wolff et al. | 219/74 |
| 3,160,732 | 12/1964 | Gamberg. | |
| 3,496,323 | 2/1970 | Lesnewich et al. | 219/74 |
| 4,749,841 | 6/1988 | Galantino et al. | 219/74 |
| 4,857,692 | 8/1989 | Larson et al. | 219/74 |
| 4,871,898 | 10/1989 | Cherne et al. | 219/74 |
| 4,902,866 | 2/1990 | Galantino | 219/74 |

FOREIGN PATENT DOCUMENTS 1188382 9/1959 France.
2374072 7/1978 France.

OTHER PUBLICATIONS

*Welding Journal*, vol. 66, No. 9, Sep. 1987, pp. 45–49, Miami, Fla. U.S.; V. R. Dillenbeck et al.: "The Effects of Various Shielding Gases and Associated Mixtures in GMA Welding of Mild Steel".
French Search Report.

*Primary Examiner*—Clifford C. Shaw
*Attorney, Agent, or Firm*—Curtis, Morris & Safford

[57] ABSTRACT

Gas mixture suitable for MAG welding at a high current using a rod filled with non-alloyed or low alloy steels, comprises 20 to 65% argon, 5 to 20% helium, and at least 30% $CO_2$.

8 Claims, No Drawings

GAS MIXTURE AND WELDING METHOD

BACKGROUND OF THE INVENTION

The invention relates to gas mixtures suitable for MAG welding at a high current with a rod filled with non-alloyed or low alloy steels, and to welding methods employing such gas mixtures.

When gas mixtures rich in argon, such as the Atal type which comprise argon, and $CO_2$ (18%), are employed in MAG welding, V-shaped penetrations are obtained. This type of penetration renders the interpenetration much more hazardous in the case of an over-under pass. Moreover, the usual gas mixtures of this type limit MAG welding currents to the order of 600A.

SUMMARY AND OBJECTS OF THE INVENTION

It is an object of this invention to overcome the problems and drawbacks of the prior art and to enable welds of rounded penetration at higher welding rates to be obtained.

The present invention relates to welding gas mixtures which comprise 20 to 65% argon, 5 to 20% helium and at least 30% $CO_2$.

DETAILED DESCRIPTION OF PREFERRED EMBODIMENTS

With these novel mixtures, it is possible to employ currents up to 1000A while retaining good density and a satisfactory bead shape. Consequently, these gas mixtures open up a new field of application of the MAG method, which application was heretofore reserved for the submerged arc welding method. When compared to the single-rod submerged arc method, MAG welding attains practically double the welding rates. In addition to the advantage of increased welding rates, the mixtures of this invention, in respect of a content of $CO_2$ higher than 30%, permit obtaining the more desirable rounded penetration.

Furthermore, the gas mixture associated with a filled rod produces weld beads of good density and the rounded shape of penetration permits very satisfactory interpenetration of over-under welds.

The rounded shape of penetration achieved with the mixtures according to the present invention also favors heat resiliencies and increases operational flexibility, in particular in the course of the first pass. Indeed, with a V-shaped penetration or an x-shaped preparation of the joint, risks of collapse of the bath are much greater than with a rounded penetration.

Owing to the high currents that can be used with these mixtures, the welding rates may be practically doubled in respect of beads identical to those obtained with the single-rod submerged arc method.

In accordance with the present invention, preferred mixtures comprise 30 to 60% $CO_2$, and more particularly 35 to 45% argon, 45 to 55% $CO_2$ and 8 to 12% helium.

Mixtures which comprise 40% argon, 50% $CO_2$ and 10% helium, with composition ranges of ±2% argon, ±2% $CO_2$ and ±1% helium give the best results.

However, with the following compositions:

| 40% Ar | 40% $CO_2$ | 20% He |
|---|---|---|
| 45% Ar | 45% $CO_2$ | 10% He | a rounded penetration also is obtained, although the value of the latter is lower by about 20% than that obtained with the aforementioned most preferred mixture.

In one embodiment, the gas mixture is formed of 35% to 55% argon, 5% to 20% helium, and 40% to 55% $CO_2$. This mixture may be further refined to 40 to 45% argon, 10 to 20% helium and 40 to 50% $CO_2$, with each constituent having composition ranges of ±2%.

The present invention also relates to an electrical welding method employing the gas mixtures discussed above with welding rods. Solid or filled rods may be used, preferably filled rods of the metal-core type such as, for example, rods commercially available under the name "SAFDUAL 200".

With the mixtures according to the invention, owing to the high penetration achieved thereby, sheets may be butt-welded without preparation up to 20 mm with an over-under pass. 30 mm sheets with an X-shaped preparation may be butt-welded in an over-under pass, whereas usually 3 to 4 passes are required when using the single-rod submerged arc method.

Apart from the aforementioned advantages, the mixtures disclosed herein have been chosen for their low rate of projections and in order to minimize emanation of fumes.

Although the use of a gas distributing carriage at the rear of the weld is not imperative, this improves the exterior appearance of the weld, particularly when the current exceeds 600A.

While the present invention has been described with reference to preferred embodiments, various changes and modifications may be made by those of ordinary skill in the art without departing from the spirit and scope of the invention. It is intended that the appended claims be interpreted as covering the embodiments disclosed and all equivalents thereto.

What is claimed is:

1. A welding gas mixture comprising 35 to 55% argon, 5 to 20% helium, and 40 to 55% $CO_2$.

2. A welding gas mixture according to claim 1, comprising 35 to 45% argon, 8 to 20% helium, and 45 to 55% $CO_2$.

3. A welding gas mixture, comprising 40%±2% to 45%±2% argon, 10%±2% to 20%±2% helium and 40%±2% to 50%±2% $CO_2$.

4. A welding gas mixture according to claim 3, comprising 40%±2% argon, 50%±2% $CO_2$ and 10%±1% helium.

5. An improved electrical welding method of the type employing rods and gas mixtures, wherein the improvement comprises employing a gas mixture comprising 35 to 55% argon, 5 to 20% helium, and 40 to 55% $CO_2$.

6. An improved electrical welding method according to claim 5, wherein the improvement comprises employing a gas mixture comprising 35 to 45% argon, 45 to 55% $CO_2$ and 8 to 20% helium.

7. An improved electrical welding method according to claim 6, wherein the improvement comprises employing a gas mixture comprising 40%±2% argon, 50%±2% $CO_2$ and 10±1% helium.

8. An improved electrical welding method according to claim 5, wherein the electrical current is up to about 1000A.

* * * * *